Aug. 11, 1964    C. DANCYGIER    3,143,801
SHEARING APPARATUS FOR CUTTING A FABRIC
Filed April 11, 1962    2 Sheets-Sheet 1
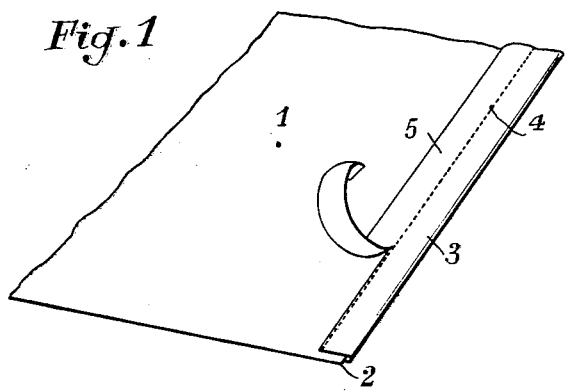
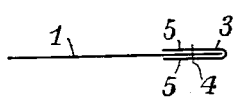 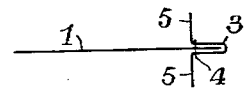 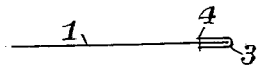
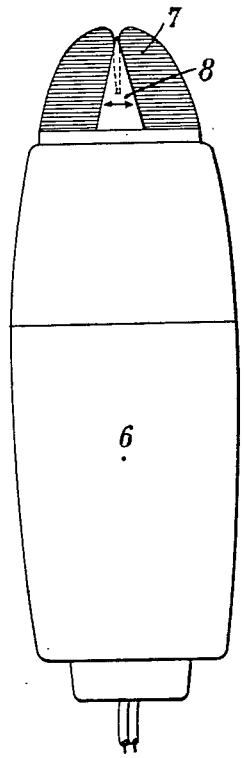 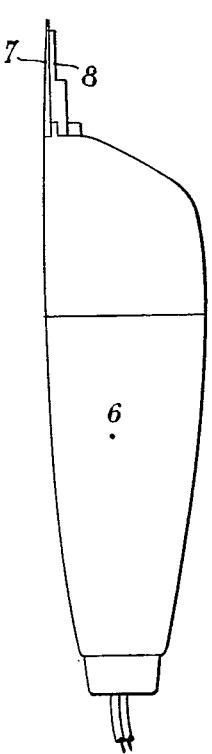
INVENTOR
CHIL DANCYGIER
Amster & Levy
ATTORNEYS Aug. 11, 1964  C. DANCYGIER  3,143,801
SHEARING APPARATUS FOR CUTTING A FABRIC
Filed April 11, 1962  2 Sheets-Sheet 2

INVENTOR
CHIL DANCYGIER
Amster & Levy
ATTORNEYS

United States Patent Office 3,143,801
Patented Aug. 11, 1964

3,143,801
SHEARING APPARATUS FOR CUTTING
A FABRIC
Chil Dancygier, 28 Rue du Docteur Blanche,
Paris, France
Filed Apr. 11, 1962, Ser. No. 186,680
Claims priority, application France Apr. 28, 1961
1 Claim. (Cl. 30—275)

In knitwear, it is customary to secure the neck bands and arm-hole or sleeve-opening bands, as well as other bands, ribbed hands and the like by the overcast method; in certain cases ladder members specially designed to this end are used.

A new method permits the fastening of separate elements along the edges of knitwear, the resulting assembly having a strength and finish comparing favorably with those obtained with a ladder-mending machine, this method being applicable very reliably and economically.

In a first step the neck or arm-hole band, the ribbed border or hem are secured by means of an ordinary sewing machine leaving a free selvedge or border beyond the stitching.

In a second step, this selvedge or border is cut adjacent the stitching by means of a suitable cutting tool or device.

The assembly of the rib band or hem on the knitwear is almost invisible in the finished article and this assembly is considerably stronger than that obtained with an overcasting machine.

The essential object of the invention is to provide a cutting device which consists of a shearing apparatus comprising a presser-foot constituting a guide member, in which the base of the band of fabric to be cut along the stitching is engaged, and a cutter driven for reciprocating or circular motion which moves above the presser-foot. The cutter may be driven from an electromotor or any other suitable power means.

According to a first form of embodiment, the apparatus comprises a small electromotor enclosed in a case through which extends the motor shaft, a cutter mounted on the outer end of the motor shaft, and a presser-foot consisting of a rigid, thin plate formed along its edge with a triangular notch and secured by means of distance-pieces under the motor case so that this presser-foot lies just under the cutter and the latter may sweep the bottom of said notch when the motor is running.

The presser-foot plate may be divided into two half-plates by a slash extending from the bottom of said notch, one of these two half-plates being fixed and the other pivotally mounted under a supporting member secured by means of said distance-pieces under said case, said distance-pieces being formed on the one hand with a central recess adapted to receive the cutter and, on the other hand, with a notch registering with, but somewhat wider than, the presser-foot notch which is variable due to the possibility of pivoting one of the two half-plates from a minimum width corresponding to the junction of said half-plates and a maximum width determined by a suitable stop.

When the apparatus is designed for manual operation it comprises preferably a handle secured on the motor case and extending laterally therefrom in a position diametrally opposite to that of the presser-foot notch.

This apparatus may also be mounted on a sewing machine whereby the cutting operation may be performed close to the stitching as the latter is made.

The cutter may advantageously consist of a rotary disc carrying along its outer peripheral edge a series of suitably inclined cutting blades.

An alternate embodiment of this cutter may consist of a blade reciprocated on the presser-foot on either side of the notch thereof.

According to another form of embodiment, the apparatus comprises a vibrator and a presser-foot, the latter consisting of two half-plates, one stationary and the other adapted to be oscillated by said vibrator, said other half-plate constituting one of the cutter blades and forming with its edge one side of the aforesaid triangular notch to constitute the cutter of the apparatus.

The invention will be better understood from the following description of a few typical forms of embodiment of the invention which are given by way of example and illustrated in the accompanying drawings, in which:

FIGURE 1 is a fragmentary perspective view showing a knitwear on one edge of which a band is being secured;

FIGURES 2 and 3 are diagrammatic sections taken across the edge of the knitwear to show its appearance after the first step of the securing process;

FIGURE 4 is a view similar to FIGS. 2 and 3 showing the elements of the assembly after the second step of the securing process;

FIGURE 5 is a plan view of the shearing apparatus of this invention;

FIGURE 6 is a side elevational view of the same apparatus;

Figure 7:
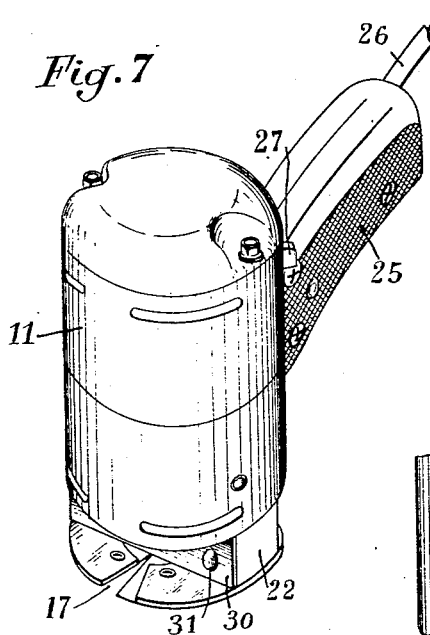
FIGURE 7 is a perspective view showing an alternate embodiment of the shearing apparatus.
Figure 8:
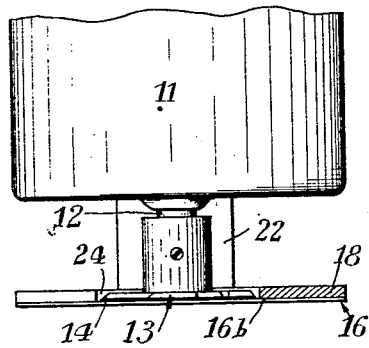
FIGURE 8 is a fragmentary view of the apparatus, partly in vertical section and partly in elevation.

The piece of knitted fabric 1 or any other knitwear receives on one side 2 a border 3 of same or different knitted fabric which is to constitute the neck band, the arm-hole band or the ribbed hem or like border of the article.

In a first step this border 3 is secured by stitching 4, for example by using an ordinary sewing machine; this stitching is applied without difficulty at the proper spacing from the edge 2 of the piece 1 to be bordered.

Upon completion of this first step there remains a strip or band 5 beyond the stitching 4 on either side of the knitted article 1.

The strips 5 are removed by cutting during a second step, this operation being carried out as close as possible to the stitching 4 whereby the finished good has the appearance shown in FIG. 4, that is, with a band or rib border or hem giving the impression that it merges in the fabric of the knitted piece 1.

To shear the excess band 5 a shearing apparatus of the type illustrated in FIGS. 5 and 6 may be used. This apparatus comprises a body 6 containing the motor (not shown) and having a rather elongated shape permitting its manual operation.

The shearing tool comprises essentially a presser-foot 7 on which operates a cutter blade 8 driven from a motor or other prime mover imparting a circular or oscillatory motion thereto.

Thus, by simply engaging each free selvedge or border 5 between the arms of the presser-foot 7, the operator may shear the selvedge as close as desired to the stitching 4.

Another shearing apparatus according to the invention is illustrated in FIGS. 7 to 10 of the drawings.

The apparatus illustrated in these figures comprises a small conventional-type electromotor enclosed in a cylindrical case 11 from which the motor shaft 12 emerges at the lower end of the case.

Mounted on the projecting portion of this shaft 12 is a cutter 13 consisting in this example of a rotary disc carrying on its outer peripheral edge a series of teeth 14, for example six in number. This cutter is adapted to revolve in the direction of the arrow f so that the teeth 14 engage the fabric with their short and steep side (see FIGS. 9 and 10).

The apparatus further comprises a presser-foot 16 consisting of a rigid thin steel plate formed with a triangular notch 17. Actually, this plate is divided into two elements forming two half-plates 16a and 16b by a slash extending from the bottom of notch 17. These half-plates are mounted on annular supporting members 18 also formed with a triangular notch registering with the notch 17 of the presser foot. The first half-plate 16b is secured on the supporting member 18 by means of rivets 29, and the half-plate 16a is adapted to pivot relative to this supporting member about a pivot pin 19 from the position in which the two half-plates closely engage each other (FIG. 9) and a position of maximum divergence as determined by the engagement of one end of an elongated hole 20 formed through the half-plate 16a with the head of a screw 21 connected to the supporting member (see FIG. 10).

Figure 9:
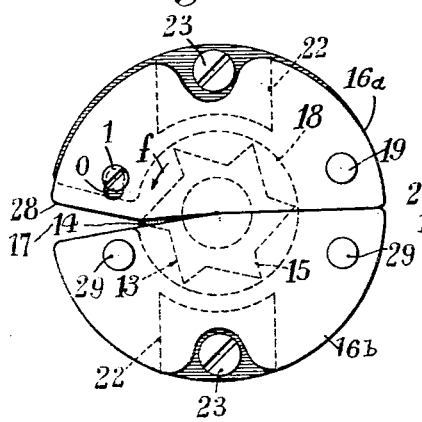
FIGURES 9 and 10 are views showing the apparatus as seen from beneath.
Figure 10:
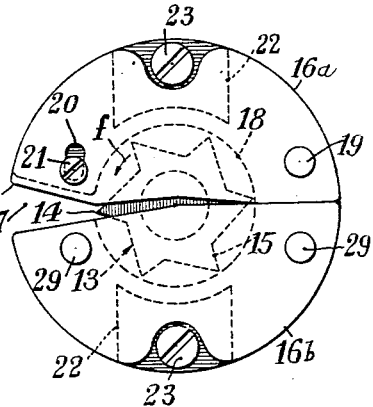

From the foregoing it is clear that the width of notch 17 can be modified at will and as a function of the thickness of the fabric or knitwear to be cut, between two limits shown in FIGS. 9 and 10 respectively. The half-plate 16a is then locked in the selected position by tightening the screw 21.

It will be noted that in any case the edge 28 of half-plate 16a projects from the adjacent edge of the supporting member 18. This projecting edge portion is adapted to constitute a guide of moderate thickness for the fabric to be cut. On the other hand, the supporting member 18 overlaps exactly the other half-plate 16b along the edge of notch 17 so that this edge is reinforced and may properly cooperate with the teeth 14 of the cutter during the shearing of the fabric introduced into the presser-foot.

The presser-foot 16 and its supporting member 18 are mounted under the motor case 11 by means of distance-pieces 22, 30 and screws or rivets 23, 31. The height of these distance-pieces is such that the cutter 13 fits in the central recess 24 of the supporting member 18 just above the half-plates 16a and 16b, and the diameter of the cutter is also such that the teeth 14 sweep the bottom of the notch 17 when the motor is running.

As the apparatus illustrated is designed for manual operation, it comprises to this end a handle 25 extending laterally from the motor case 11 in a position diametrally opposite to that of the notch 17 of the presser-foot. This handle may receive the wires 16 for energizing the electromotor on which a switch 27 is mounted.

The half-plate 16b is made preferably of hardened steel so as to be very strong for the cutting action actually takes place between its edge in the bottom of notch 17 and the cutter teeth 14 when the cutter revolves in the direction of the arrow f shown in the drawing. The other half-plate 16a needs not be so strong as plate 16b since its function consists simply in guiding the fabric inserted into the notch 17 while affording a very clean cut flush with the stitching constituting the cutting line to be adhered to, due to the moderate thickness of its edge 28 projecting from the supporting member 18.

Of course, various modifications may be brought to the apparatus described hereinabove, and alternate embodiments may be contemplated, notably of the type suggested in the preamble of this description, without departing from the spirit and scope of the invention as set forth in the appended claim.

What I claim is:

A shearing apparatus for cutting a fabric comprising a small electromotor enclosed in a case through which extends the motor shaft, a cutter mounted on the shaft end projecting from said case, said cutter consisting of a rotary disc carrying on its outer peripheral edge a series of cutting teeth having a suitable inclination, a supporting member secured by means of distance-pieces under said case, and a presser-foot consisting of a rigid thin plate having a triangular notch formed in its edge and divided into two half-plates by a slash extending from the bottom of said notch, said two half-plates being mounted the one fixed and the other pivoting under said supporting member and said supporting member being formed on the one hand with a central hole adapted to receive said cutter, so that the latter overlies the presser-foot very close thereto and sweeps the bottom of said notch when said motor is running, and on the other hand with a notch registering with and wider than the notch of said presser-foot which is variable, as a consequence of the possibility of pivoting one of the half plates from a minimum corresponding to the junction of said half plates to a maximum determined by an adjustable stop.

References Cited in the file of this patent

UNITED STATES PATENTS

| | | |
|---|---|---|
| 619,326 | Merrill | Feb. 14, 1899 |
| 1,299,572 | Gryniwicz | Apr. 8, 1919 |
| 1,334,112 | Myers | Mar. 16, 1920 |
| 1,715,675 | Rader | June 4, 1929 |
| 1,996,813 | Jeppsson | Apr. 9, 1935 |
| 2,198,266 | Gardner | Apr. 23, 1940 |
| 2,283,403 | Wiggens | May 19, 1942 |
| 2,291,839 | Smola | Aug. 4, 1942 |
| 2,591,740 | Stilwell et al. | Apr. 8, 1952 |
| 2,610,327 | Koppel | Sept. 16, 1952 |
| 2,652,626 | Dutcher | Sept. 22, 1953 |
| 2,653,381 | Rooke | Sept. 29, 1953 |
| 2,741,841 | Egeth | Apr. 17, 1956 |

FOREIGN PATENTS

| | | |
|---|---|---|
| 415,352 | Italy | Oct. 8, 1946 |
| 225,742 | Australia | Apr. 24, 1958 |